United States Patent
Milliken et al.

(10) Patent No.: US 6,656,576 B1
(45) Date of Patent: Dec. 2, 2003

(54) COATED CERAMIC PARTS AND METHOD OF FABRICATING SAME

(75) Inventors: Dale C. Milliken, Perrysburg, OH (US); William E. Bosken, Jr., Perrysburg, OH (US)

(73) Assignee: Owens Brockway Glass Container Inc., Toledo, OH (US)

( * ) Notice: Subject to any disclaimer, the term of this patent is extended or adjusted under 35 U.S.C. 154(b) by 115 days.

(21) Appl. No.: 09/741,979

(22) Filed: Dec. 20, 2000

(51) Int. Cl.[7] .............................. B32B 7/02; B32B 3/10; B05D 5/00; C23C 16/00; B29C 71/00
(52) U.S. Cl. .................... 428/213; 428/134; 427/243; 427/453; 264/340
(58) Field of Search ................................. 428/213, 134; 427/243, 453; 264/340

(56) References Cited

U.S. PATENT DOCUMENTS

| | | |
|---|---|---|
| 4,299,865 A | 11/1981 | Clingman et al. |
| 4,950,321 A | 8/1990 | DiFrank |
| 4,985,379 A | 1/1991 | Egerton et al. |
| 5,112,378 A | 5/1992 | Weisenburger et al. |
| 5,460,770 A | 10/1995 | Egerton et al. |
| 5,660,610 A | 8/1997 | DiFrank et al. |
| 5,705,231 A | 1/1998 | Nissley et al. |
| 5,939,147 A | 8/1999 | Jones |
| 6,146,443 A | 11/2000 | Eckert |

FOREIGN PATENT DOCUMENTS

| | | |
|---|---|---|
| DE | 19948 634 A1 | 5/1992 |
| EP | 0 911 298 A1 | 4/1999 |
| GB | 2140001 A | 11/1989 |
| HU | 174331 | 9/1996 |
| HU | 219035 B | 9/1997 |

OTHER PUBLICATIONS

XP-002241178; Enhanced cerium migration in ceria–stabilised zirconia; John Thornton, Amit Majumdar, Grant McAdam; Surface and Coating Technology 94–95 (1997) 112–117.

*Primary Examiner*—Cynthia H. Kelly
*Assistant Examiner*—L. Ferguson

(57) ABSTRACT

An abrasion resistant article (10, 30, 40) for use, while submerged or partly submerged in molten glass, in a glass article manufacturing operation, the article having a ceramic element (12, 32, 42) coated on its molten glass contacting surfaces with a thin base coating of a nickel chromium-aluminum-cobalt-yttria-composite powder (18, 34, 44) and a somewhat thicker coating (20, 36, 46) of a prealloyed ceria-yttria stabilized zirconium oxide superimposed on the base coating.

11 Claims, 3 Drawing Sheets

COATED CERAMIC PARTS AND METHOD OF FABRICATING SAME

BACKGROUND OF THE INVENTION

1. Field of the Invention

This invention relates to coated ceramic parts of the type used in manufacturing articles from molten glass, and to a method of fabricating such parts. More particularly, this invention relates to the coating of ceramic parts that are to be submerged, or partly submerged, in molten glass to retard the abrasion of the molten glass contacting surfaces of such parts by the molten glass.

2. Description of the Related Art Including Information Disclosed Under 37 CFR 1.97 AND 1.98

In the manufacture of glass articles from a molten glass composition, for example, in the manufacture of glass containers from a molten soda-lime-silica glass composition by a glass container forming machine of the individual section (I.S.) type, various ceramic parts are used at locations where the parts are submerged or partly submerged in the molten glass. Such parts include a ceramic orifice ring, as generally described in U.S. Pat. No. 4,950,321 (DiFrank), which is submerged in molten glass with its upper surface in contact with molten glass, and ceramic glass flow control needles, as identified by reference numeral 32 in U.S. Pat. No. 5,660,610 (DiFrank et al.), and a ceramic feeder tube, as identified by reference numeral 80 in the aforesaid '610 patent, which are partly submerged, while in use, in molten glass. The aforesaid '321 and '610 patents are assigned to the assignee of this application, and their disclosures are incorporated by reference herein.

Molten glass compositions, including soda-lime-silica glass compositions, are very abrasive to the types of ceramic compositions that are used in the manufacture of parts for use, while submerged or partly submerged, in molten glass, and this necessitates frequent replacement of such ceramic parts, orifice rings, for example, typically requiring replacement at 30–60 day intervals, depending on glass color and temperature, and being shorter in high production installations.

BRIEF SUMMARY OF THE INVENTION

It has now been found, however, that it is possible to substantially extend the useful lives of ceramic parts used, while submerged in molten glass, to produce useful articles from the molten glass. The useful lives of the ceramic parts are substantially extended by coating all molten glass contacting surfaces of each article with a superimposed pair of these coatings, each such coating being applied in a fairly thin layer. The innermost or base or ceramic part-contacting coating which need only be applied in an approximate thickness of 0.002 in., is a composite powder coating that is made up of a nickel chromium-aluminum-cobalt-yttria composite powder. Such a coating powder is available from Metco Division of Perkin-Elmer Corporation, whose headquarters are in Westbury, Long Island, N.Y., under their product designation Metco 461. The base coated-ceramic part is then further coated, to an approximate thickness of 0.006 in., with a powder coating that is made up of a prealloyed ceria-yttria stabilized zirconium oxide, which is also available from the Metco Division of Perkin-Elmer Corporation, and this coating powder is offered under the product designation Metco 205 NS powder. It is believed that the base coat, which serves as a bond coat for the top coat, and the top coat for each such coated ceramic part will interact with the ceramic part, after being heated when the part is put into production, to produce a high strength, high resistant coating. Such a coating also produces a thermal barrier between the ceramic and the molten glass, and this thermal barrier protects the ceramic part, to reduce thermal shock thereto and to alleviate the occurrence of cracking.

Accordingly, it is an object of the present invention to provide enhanced life ceramic parts for use, while submerged or partly submerged, in molten glass, in the manufacture of articles from the molten glass. It is also an object of the present invention to provide a method for treating ceramic glass-making parts to extend the useful lives of such parts, notwithstanding that such parts are to be used, while submerged or partly submerged, in molten glass, which is otherwise highly abrasive to such ceramic parts.

For a further understanding of the present invention and the objects thereof, attention is directed to the drawing and the following brief description thereof, to the detailed description of the invention and to the appended claims.

DETAILED DESCRIPTION OF THE INVENTION

Figure 1:
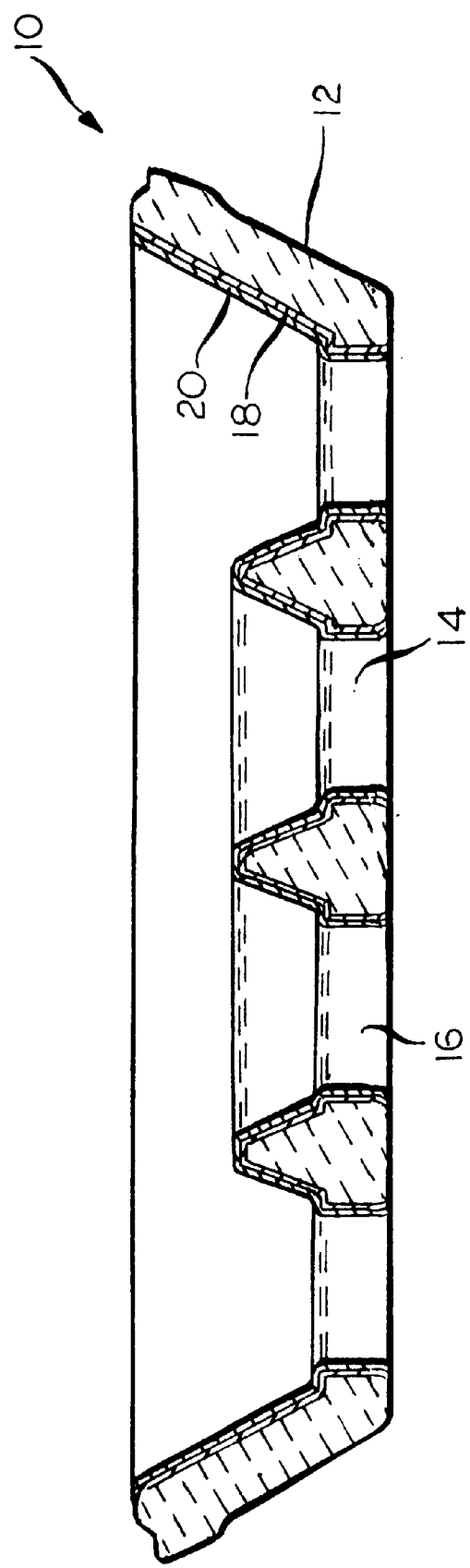
FIG. 1 is an elevation view, in cross-section, of a ceramic orifice ring according to the present invention, which has been fabricated by the method of the present invention, for use in a glass manufacturing operation.

An orifice ring according to the present invention is identified generally by reference numeral 10 in FIG. 1. The orifice ring 10 is made up of a ceramic element 12, which may be of conventional construction, and is designed to be used at the outlet of a molten glass feeder bowl that is used to provide molten glass to an I.S. glass forming machine through openings 14, 16, in the orifice ring 10. Thus, the orifice ring 10 is submerged in molten glass during its useful life with its upper surface in contact with the molten glass.

The ceramic element 12 of the orifice ring 10 is provided with a superimposed pair of coatings 18, 20 on each of its glass contacting surfaces. The innermost or base coating 18 is a coating that is made up of nickel chromium-aluminum-cobalt-yttria composite powder that is applied to the ceramic element 12 to an approximate thickness of 0.002 in., by plasma spraying, and Metco 461 powder coating from Metco Division of Perkin-Elmer is a suitable coating material for use as the coating 18.

The ceramic element 12, with the coating 18 applied thereto, is again coated, this time with a coating 20, which is applied to the exterior of the coating 18 on the ceramic element 12. The coating 20 is also applied as a powder by plasma coating, and is applied to an approximate thickness of 0.006 in. A prealloyed ceria-yttria stabilized zirconium oxide, such as that available from Metco Division of Perkin-Elmer under their designation Metco 205 NS, is suitable for use as the coating 20. The Metco brochure for the Metco 205 NS coating describes the plasma application of the coating to a ceramic element, and its disclosure is also incorporated by reference herein. The orifice ring 10, with the coatings 18, 20 applied to the ceramic element 12 thereof, is installed without further processing in a glass feeder bowl. It is believed that the heat required during the plasma spraying of the coatings (18 and 20) allows for interaction between the ceramic element 12 and the base coating 18, and also interaction between the base coating 18 and the coating 20. This interaction between the ceramic element 12, the base coating 18 and the coating 20 creates a thermal barrier that protects the ceramic element to reduce the thermal shock it experiences upon sudden exposure to molten glass, and alleviates the occurrence of cracking of the ceramic element 12. The dual coating 18, 20 of the ceramic element 12 not only increases the wear resistance of the orifice ring 10 in spite of its submergence in molten glass, but it also protects those areas that have less ceramic mass, such as the bridge area (not shown) of the orifice ring, from excessive thermal gradients.

Figure 2:
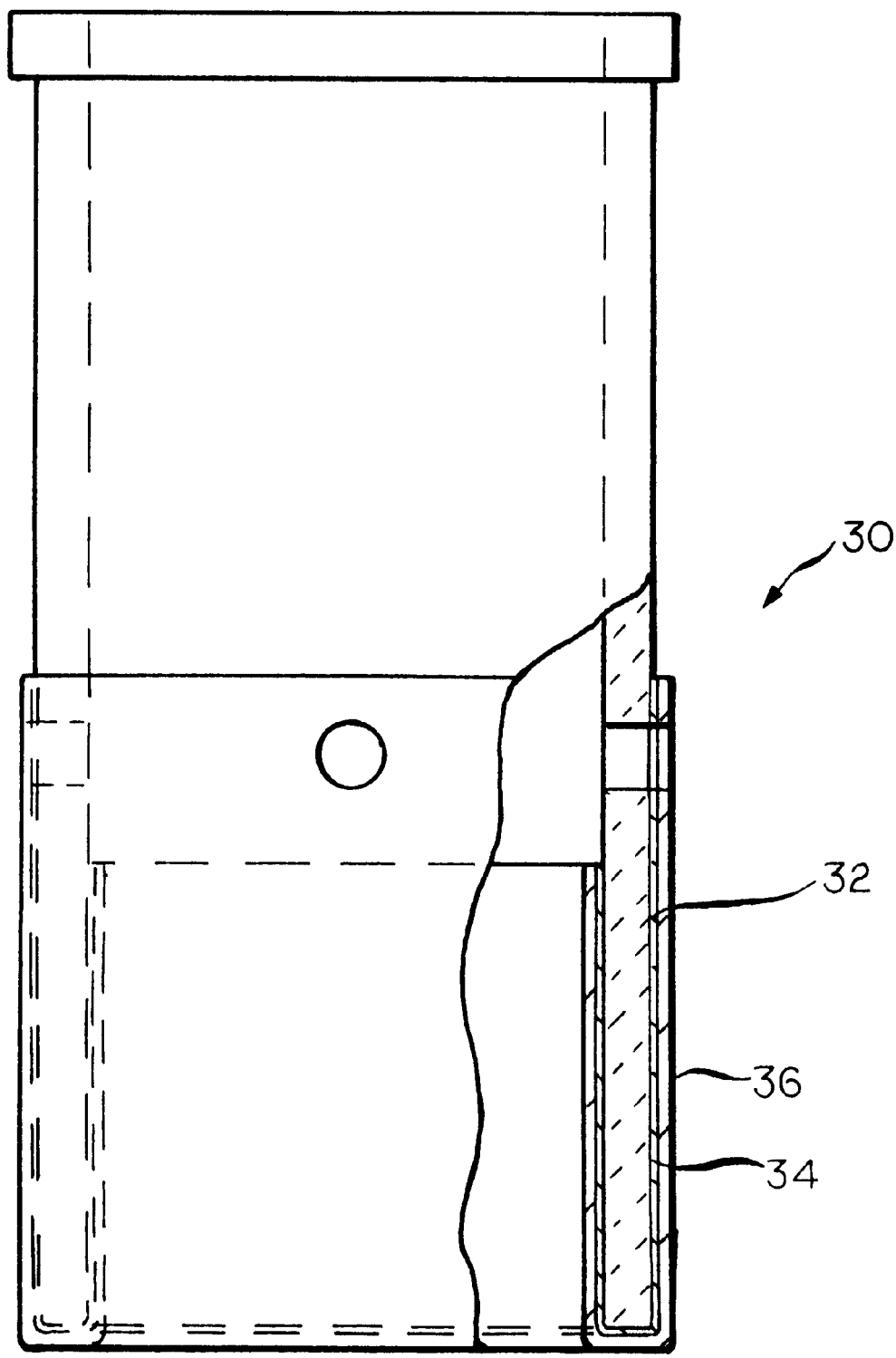
FIG. 2 is an elevation view partly in cross-section, of a ceramic feeder tube according to the present invention, which has been fabricated by the method of the present invention, for use in a glass manufacturing operation.

A feeder tube according to the present invention is identified generally by reference numeral 30 in FIG. 2. The feeder tube 30 is made up of an annular ceramic element 32, which may be of conventional construction, and is designed to have its lowermost end submerged in molten glass in a feeder bowl that is used to provide molten glass to an I.S. glass forming machine. Thus, the lowermost end of the feeder tube 30 is submerged in molten glass during its useful life.

The portion of the ceramic element 32 that is submerged in molten glass is provided with a superimposed pair of coatings 34, 36 on all of its molten glass-exposed surfaces. The innermost or base coating 34 is a coating that is made up of a nickel chromium-aluminum-cobalt-yttria-composite powder, and this coating is applied to the submerged portion of the ceramic element 32, to an approximate thickness of 0.002 in., by a plasma spraying. Metco 461 powder coating from Metco Division of Perkin-Elmer is a suitable coating material for use as the coating 34.

The submerged portion of the ceramic element 32, with the coating 34 applied thereto, is again coated with the coating 36, which is applied to the exterior of the coating 34 on the ceramic element 32. The coating 36 is also applied as a powder by plasma coating, and is applied to an approximate thickness of 0.006 in., a prealloyed ceria-yttria stabilized zirconium oxide, such as that available from Metco Division of Perkin-Elmer under their designation Metco 205 NS being suitable for use as the coating 36.

The feeder tube 30, with the coatings 34, 36 applied to the ceramic element 32 thereof, is installed without further processing in a glass feeder bowl with molten glass extending from the lowermost end of the feeder tube 30 to a level not above the level of the coatings 34, 36 on the ceramic element 32 thereof.

Figure 3:
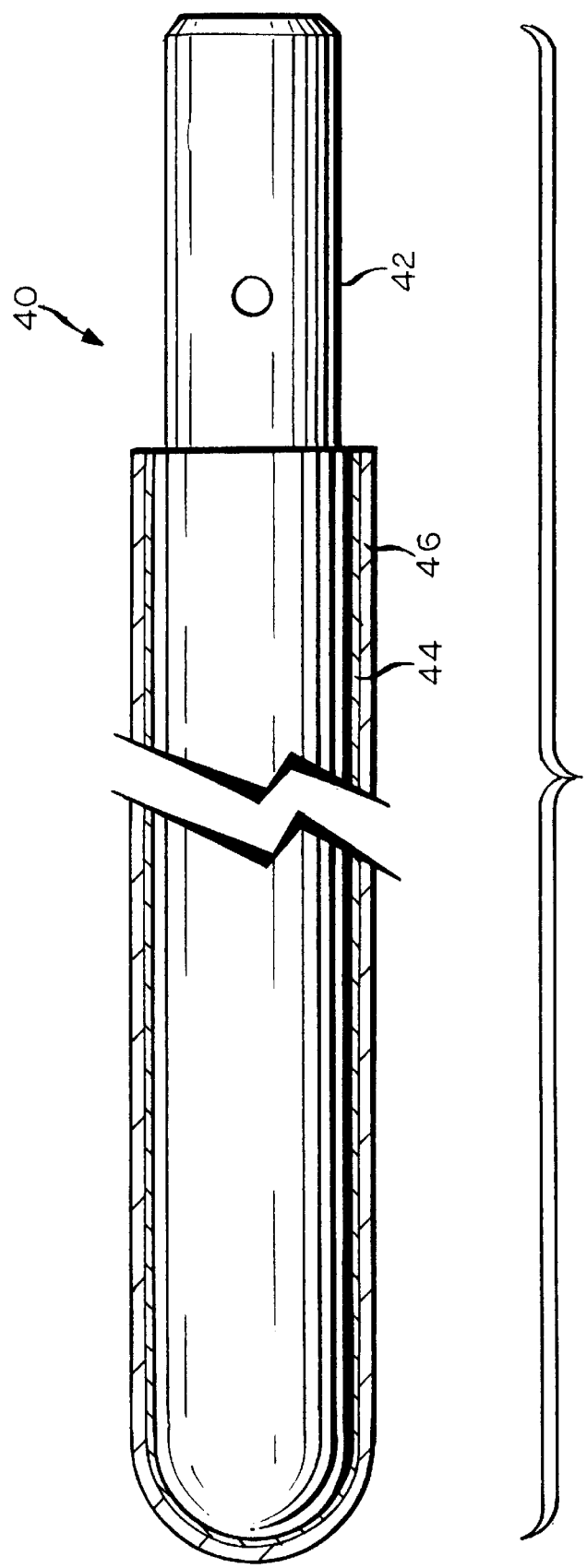
FIG. 3 is an elevation view, partly in cross-section, of a ceramic flow control needle according to the present invention, which has been fabricated by the method of the present invention, for use in a glass manufacturing operation.

A flow control needle according to the present invention is identified generally by reference numeral 40 in FIG. 3. The flow control needle 40 is made up of a ceramic element 42, which may be of conventional construction, and is designed to be used to control the flow of molten glass through submerged outlets of a molten glass feeder bowl that is used to provide molten glass to an I.S. glass forming machine. Thus, the lowermost portion of the flow control needle is submerged in molten glass during its useful life.

The ceramic element 42 of the flow control needle 40 is provided, in the lowermost portion thereof, with a superimposed pair of coatings 44, 46 on its lowermost portion, namely, the portion that is to be submerged in molten glass in a feeder bowl. The innermost or base coating 44 is a coating that is made up of a nickel chromium-aluminum-cobalt-yttria-composite powder, and this coating is applied to element 42 to an approximate thickness of 0.002 in., by plasma spraying. Metco 461 powder coating from Metco Division of Perkin-Elmer is a suitable coating material for use as the coating 44.

The ceramic element 42, with the coating 44 applied thereto, is again coated, with the coating 46, which is also applied to the exterior of the coating 44 on the ceramic element 42. The coating 46 is also applied as a powder by plasma coating, and is applied to an approximate thickness of 0.006 in., a prealloyed ceria-yttria stabilized zirconium oxide, such as that available from Metco Division of Perkin-Elmer under their designation Metco 205 NS, being suitable for use as the coating 46.

Although the best mode contemplated by the inventors for carrying out the present invention as of the filing date hereof has been shown and described herein, it will be apparent to those skilled in the art that suitable modifications, variations and equivalents may be made without departing from the scope of the invention, such scope being limited solely by the terms of the following claims and the legal equivalents thereof.

What is claimed is:

1. A method of improving the resistance to abrasion from molten glass of a ceramic element that is adapted for use in contact with molten glass, the method comprising:
   applying, to a molten glass contacting surface of the ceramic element, a thin base coating of a nickel chromium-aluminum-cobalt-yttria-composite powder;
   applying to the thin base coating a somewhat thicker coating of a prealloyed ceria-yttria stabilized zirconium oxide; and then
   heating the ceramic element with the thin coating and the thicker coating to produce a durable, abrasion-resistant molten glass contacting surface on the ceramic element.

2. A method according to claim 1 wherein the base coating is applied to an approximate thickness of 0.002 in.

3. A method according to claim 2 wherein the thicker coating is applied to a thickness of approximately 0.006 in.

4. A method according to claim 2 wherein the base coating is applied as a powder by plasma spraying.

5. A method according to claim 3 wherein the thicker coating is applied as a powder by plasma spraying.

6. An abrasion-resistant ceramic element adapted to be used in contact with molten glass, the ceramic element comprising:
   a thin base coating of a nickel chromium-aluminum-cobalt-yttria-composite powder on each molten glass contacting surface of the ceramic element; and
   a somewhat thicker coating of a prealloyed ceria-yttria stabilized zirconium oxide on the exterior of the base coating.

7. A ceramic element according to claim 6 wherein the base coating is applied to an approximate thickness of 0.002 in.

8. A ceramic element according to claim 6 wherein the thicker coating is applied to a thickness of approximately 0.006 in.

9. A ceramic element according to claim 6 in which the ceramic element is an orifice ring and wherein each of the base coating and the thicker coating is applied to every exterior surface of the orifice ring.

10. A ceramic element according to claim herein the ceramic element is an annular feeder tube, and wherein each of the base coating and the thicker coating is applied to the feeder tube both on its inner surface and its outer surface, to the depth of the feeder tube that is adapted to be submerged in molten glass.

11. A ceramic element according to claim 7 wherein the ceramic element is a flow control needle that is solid in cross-section, and wherein each of the thin base coating and the somewhat thicker coating is applied to the lowermost portion of the flow control needle that is adapted to be submerged in molten glass.

* * * * *